United States Patent
Anderson et al.

(10) Patent No.: US 12,202,677 B2
(45) Date of Patent: Jan. 21, 2025

(54) CONVEYOR ROLLER TUBE

(71) Applicant: PROK CONVEYOR COMPONENTS PTY LTD, Bayswater (AU)

(72) Inventors: Raymond Anderson, Bayswater (AU); Brayden Kubala, Bayswater (AU)

(73) Assignee: Prok Conveyor Components PTY LTD, Bayswater (AU)

( * ) Notice: Subject to any disclaimer, the term of this patent is extended or adjusted under 35 U.S.C. 154(b) by 90 days.

(21) Appl. No.: 18/017,176

(22) PCT Filed: Jun. 30, 2021

(86) PCT No.: PCT/AU2021/050696
§ 371 (c)(1),
(2) Date: Jan. 20, 2023

(87) PCT Pub. No.: WO2022/016208
PCT Pub. Date: Jan. 27, 2022

(65) Prior Publication Data
US 2023/0312260 A1    Oct. 5, 2023

(30) Foreign Application Priority Data

Jul. 23, 2020  (AU) ................................ 2020902575

(51) Int. Cl.
*B65G 39/07* (2006.01)
*B29C 48/09* (2019.01)
(Continued)

(52) U.S. Cl.
CPC .............. *B65G 39/07* (2013.01); *B29C 48/09* (2019.02); *B29C 48/21* (2019.02);
(Continued)

(58) Field of Classification Search
CPC .... B65G 2207/48; B65G 39/12; B65G 39/07; B65G 39/00; B32B 1/08; B29C 48/17; B29C 48/16; B29C 48/21; B29C 48/32
See application file for complete search history.

(56) References Cited

U.S. PATENT DOCUMENTS

2005/0015986 A1   1/2005   Stebnicki et al.
2023/0116108 A1*  4/2023   Widmer ................. B65G 39/02
                                                          198/780

FOREIGN PATENT DOCUMENTS

CN         1276950         5/2005
KR    20180022466 A  *  6/2018  ............ B65G 39/02
(Continued)

OTHER PUBLICATIONS

International Search Report for PCT/AU2021/050696, dated Sep. 7, 2021, 3 pages.

*Primary Examiner* — James R Bidwell
(74) *Attorney, Agent, or Firm* — Chrisman Gallo Tochtrop LLC

(57) ABSTRACT

A conveyor roller tube (1) including a plurality of co-extruded polymer layers (2, 3). The tube (1) includes an inner layer (2) and an outer layer (3), and an optional intermediate layer. The inner layer (2) is formed of a first polymer material. The outer layer (3) is formed of a second polymer material. The outer layer is formed to have high wear properties and is also formed to be of a different color to the adjacent layer (2) thereto so that a visual indication of the wear of the roller tube (1) is provided.

15 Claims, 3 Drawing Sheets

(51) Int. Cl.
  *B29C 48/21*    (2019.01)
  *B29K 23/00*    (2006.01)
  *B29K 77/00*    (2006.01)
  *B29L 31/32*    (2006.01)
  *B65G 39/12*    (2006.01)

(52) U.S. Cl.
  CPC .................. *B29K 2023/065* (2013.01); *B29K 2023/0683* (2013.01); *B29K 2077/00* (2013.01); *B29L 2031/326* (2013.01); *B65G 39/12* (2013.01); *B65G 2207/48* (2013.01)

(56) References Cited

FOREIGN PATENT DOCUMENTS

| WO | 2000009317 | 2/2000 | |
|---|---|---|---|
| WO | 2005007384 | 1/2005 | |
| WO | WO-2006010443 A1 * | 2/2006 | ............. B65G 39/07 |
| WO | WO-2011117048 A1 * | 9/2011 | ......... C03B 23/0252 |
| WO | WO-2015010158 A1 * | 1/2015 | ............. B65G 39/02 |
| WO | WO-2022135960 A1 * | 6/2022 | ............. B33Y 10/00 |

* cited by examiner

CONVEYOR ROLLER TUBE

CROSS-REFERENCE TO RELATED APPLICATIONS

This application is a U.S. National Stage entry of PCT/AU2021/050696, filed Jun. 30, 2021, which claims benefit of priority to Australian application 2020902575, filed Jul. 23, 2020, the entire disclosures of which are hereby incorporated herein by reference.

TECHNICAL FIELD

The present invention relates to a conveyor roller tube, and in particular, to a conveyor roller tube which includes a plurality of co-extruded layers. The present invention also relates to a conveyor roller and a conveyor system which includes at least one such roller tube, and, to a method of manufacturing such roller tubes.

BACKGROUND ART

Any reference herein to known prior art does not, unless the contrary intention appears, constitute an admission that such prior art is commonly known by persons skilled in the art to which the invention relates, at the priority date of this application.

Conveyor systems are used in a number of industrial situations, including in manufacturing, production and mining operations for moving various materials from one location to another. Such conveyor systems take a variety of forms, and typically incorporate a number of component parts.

For example, in mining applications for conveying coal or other minerals, the conveyor components of a conveyor system may typically include the conveyor rollers, including one or more drive pulley which drives a conveyor belt, a plurality of carrying idlers which support the belt carrying the mineral or other load to be conveyed, return rollers to support the returning portion of the endless conveyor belt, and, a take-up pulley and its associated bend pulley to ensure that the belt remains taut during operation.

These conveyor rollers have component parts, including roller tubes and bearings. These component parts are prone to wear out and/or become damaged due to dust infiltration and the like.

Roller tubes have traditionally been manufactured of metal material, as they are required to have high mechanical strength, and, in use, are subjected to significant wear effects.

Whilst there has been a recent move to the manufacture of conveyor roller tubes from plastics or other non-metallic materials, there are obvious difficulties in creating a plastic roller tube which is strong and durable enough to withstand the high loads to which the roller tubes are subjected, and, which has high wear-resistance, fire resistance, and/or anti-static properties.

Furthermore, when a conveyor roller tube does wear out and fail, the conveyor system is typically required to be shut down for immediate repair and replacement of the conveyor roller tube. This shut down, particularly if it occurs unexpectedly, can be very inconvenient and can be result in significant loss of revenue to the system operator.

This therefore identifies a need for an improved roller tube which overcomes at least some of these disadvantages of the prior art.

SUMMARY DISCLOSURE

The present invention seeks to provide a conveyor roller tube which overcomes at least some of the disadvantages of the prior art.

The present invention also seeks to provide a conveyor roller tube which is preferably simple and cost effective to manufacture.

The present invention also seeks to provide a conveyor roller tube which preferably has improved wear characteristics over at least some of the prior art roller tube devices.

The present invention also seeks to provide a conveyor roller tube which preferably is visually easy to identify when it has worn out and/or requires replacement.

The present invention also seeks to provide a method of manufacturing a multi-layer conveyor roller tube which may preferably be performed by a co-extrusion process.

In one broad form, the present invention provides a conveyor roller tube comprising a plurality of co-extruded polymer layers, including:
    an inner layer including a first polymer material; and,
    an outer layer including a second polymer material;
wherein said outer layer is formed to have high wear-resistant properties; and,
wherein said outer layer is formed to be of a different color to the layer adjacent thereto to provide a visual indication of the wear of said roller tube.

In a preferred form, the conveyor roller tube further comprises:
    at least one intermediate layer provided between said inner and outer layers.

Preferably, said outer layer is formed to have high wear-resistance properties.

Also, preferably, said outer layer is formed to have any one or combination of the characteristics of:
    UV stability,
    fire-resistance; and,
    anti-static properties.

Also, preferably, said outer layer is formed of a first polymer material comprising any one or combination of:
    polyethylene;
    high density polyethylene (HDPE);
    ultra high molecular weight polyethylene (UHMWPE); and,
    nylon.

In a preferred form, said outer layer includes a second additive.

Also, preferably, said second additive includes glass fibres.

Preferably, said inner layer is formed to have any one or combination of the characteristics of:
    high flexural strength;
    high flexural modulus;
    high elongation under tensile load; and,
    high tensile strength.

Also, preferably, said inner layer is formed of a second polymer material comprising any one or combination of:
    polyethylene;
    high density polyethylene (HDPE);
    ultra high molecular weight polyethylene (UHMWPE); and,
    nylon.

Preferably, said inner layer includes a first additive.

Also, preferably, said first additive includes glass fibres.

In a preferred form, wherein at least one layer is formed to be of a different color. Also in a preferred form, each layer is formed to be of predetermined thickness. Preferably, said at least one intermediate layer includes any one or combination of: an intermediate wear indication layer of a different color, to provide a visual indication of wear of said roller tube;
   an intermediate bonding layer, to facilitate bonding between adjacently positioned layers thereto; and,
   an intermediate strength layer, to strengthen said roller tube.

In a first broad from, the present invention provides a conveyor roller comprising the conveyor roller tube.

In yet a further broad form, the present invention provides a conveyor idler comprising at least one conveyor roller tube.

In yet a further broad form, the present invention provides a conveyor system including a plurality of conveyor roller tubes.

In yet a further broad form, the present invention provides a method of manufacturing the conveyor roller tube.

BRIEF DESCRIPTION OF THE DRAWINGS

Notwithstanding any other forms which may fall within the scope of the method and apparatus set forth in the summary, specific embodiments of the method and apparatus will now be described by the way of example and with reference to the accompanying drawings in which.

DETAILED DESCRIPTION

Figure 1:
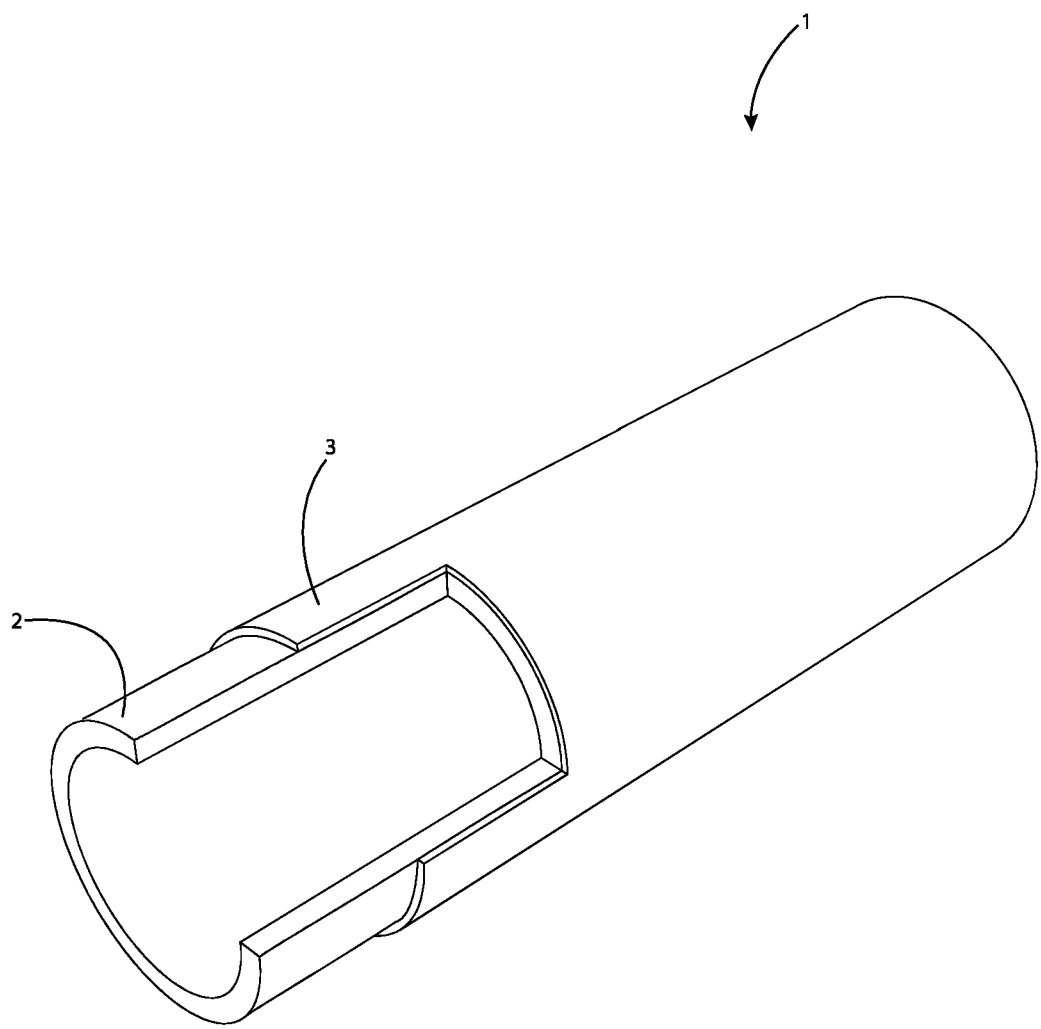
FIG. 1 shows an isometric, partially cutaway, view of a conveyor roller tube in accordance with an exemplary embodiment of the present invention.

In FIG. 1 is shown a conveyor roller tube, generally designated by the numeral 1, which includes a plurality of co-extruded layers of polymer material.

In particular, the conveyor roller tube 1 includes an inner layer 2, and an outer layer 3.

The roller tube 1 may incorporate one or more additional intermediate layers provided between the inner layer 2 and the outer layer 3.

Figure 2:
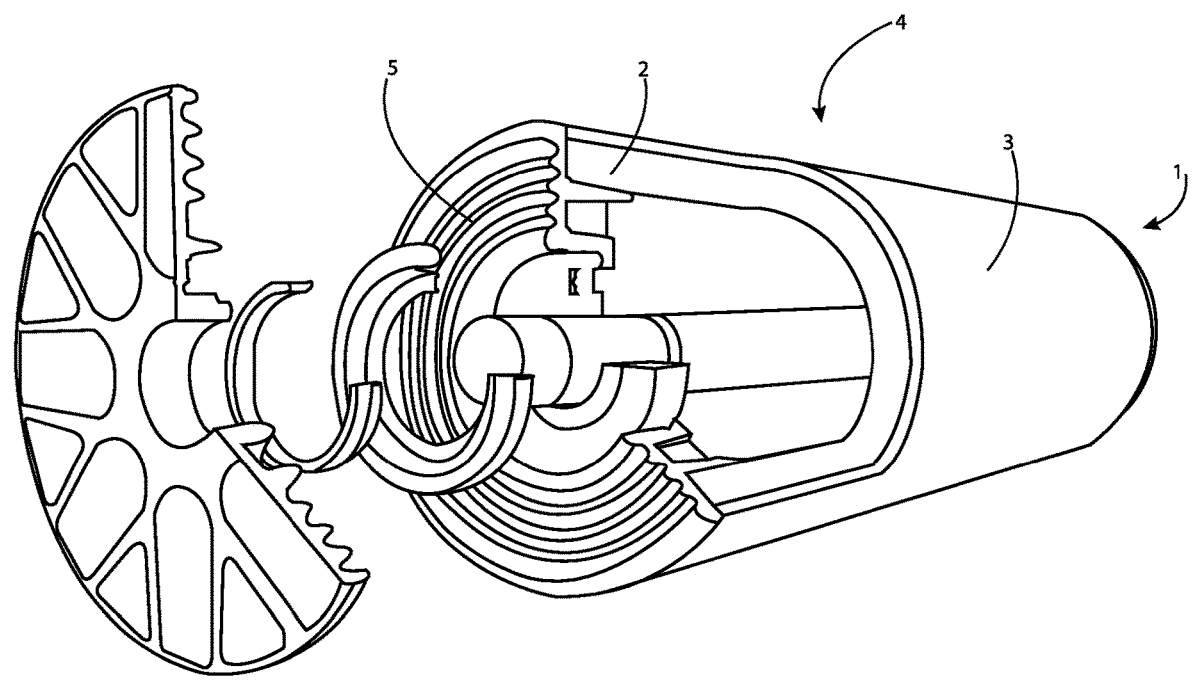
FIG. 2 illustrates a conveyor roller incorporating a conveyor roller tube of the present invention.

The roller tube 1 is typically a component part of a conveyor system, which may incorporate a plurality of such roller tubes 1. As shown in FIG. 2, the roller tube 1 may be part of a conveyor roller 4, which, along with various other components, enable it to be attached to a roller bearing housing 5. As the details of these parts are well known to persons skilled in the art, they will not be further explained herein.

Figure 3:
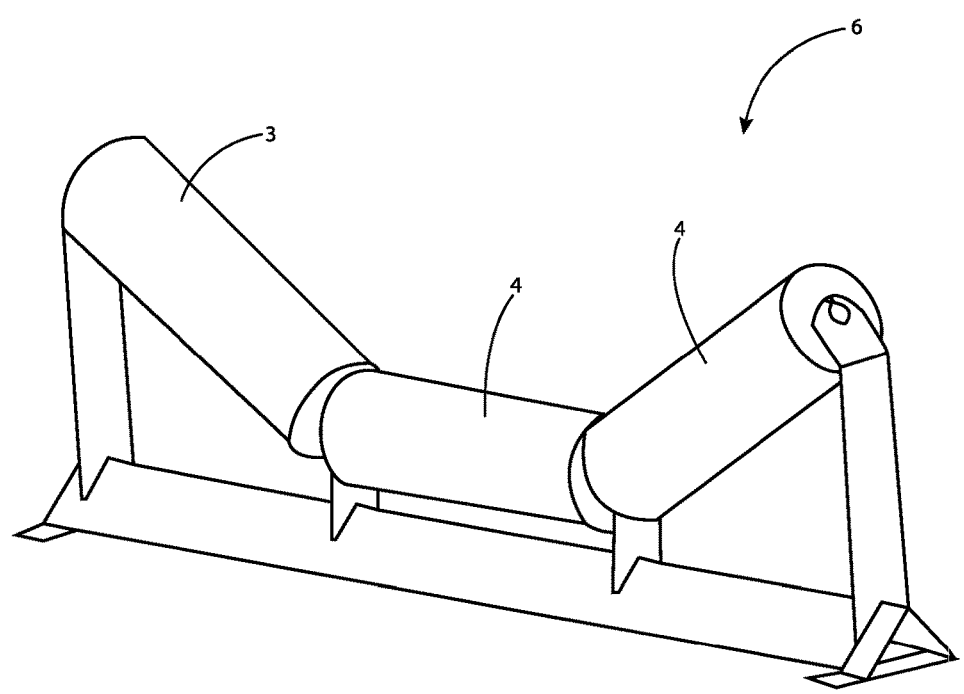
FIG. 3 illustrates a conveyor idler incorporating the plurality of conveyor rollers shown in FIG. 2; and, FIG. 4 illustrates a flow chart outlining exemplary main steps in an embodiment of a production process to produce a conveyor roller tube in accordance with the present invention.

A plurality of rollers 4 are typically arranged together as shown in FIG. 3 to form an idler 6. Plurality of idlers 6 are typically provided in spaced apart configuration to form an overall conveyor system.

The conveyor roller tube 1, incorporating the inner layer 2 and the outer layer 3 is preferably manufactured such that the inner layer 2 and the outer layer 3, are formed by a co-extrusion process.

The outer layer 3 is preferably formed to have superior wear resistant properties, as well as other desirable physical characteristics, including, but not limited to, UV stability, fire resistance, and/or antistatic properties.

The outer layer 3 is preferably formed of a polymer material. The polymer material may typically be polyethylene, high density polyethylene (HDPE), ultra high molecular weight polyethylene (UHMWPE), nylon, or any other similar type of polymer material which has the desired characteristics of the roller tube.

The outer layer may optionally include an additive, such as, glass fibres, to improve the wear resistance of the outer layer 3. Other additives may be included to enhance other desired characteristics of the layer 3.

The inner layer 2, is typically formed to have different characteristics to the outer layer 3. For example, the inner layer 2 is formed to have characteristics which may include any one or combination of high flexible strength, high flexible modulus, high elongation under tensile load, and/or, high tensile strength.

The inner layer 2 may also be formed of a polymer material. Being of similar base material to that of the outer layer 3 ensures that it bonds well to the outer layer 3 during the co-extrusion process.

The inner layer 2 maybe formed of any suitable polymer material, such as, but not limited to, high density polyethylene, nylon, and polyethylene.

The inner layer 2 may also include an additive, such as, but not limited to, glass fibres. Any additive may be selectively chosen to improve the desired properties of the inner layer 2.

In practice, the conveyor roller tube 1 of the present invention is preferably formed such that each of the layers 2 and 3 are of a different color. This enables the wearing of the outer layer to be easily visually observed by a user. Once wear is noticed, the roller may then be replaced.

It will be appreciated that each layer may be formed of any desired thickness, according to the application and desired wear resistance of the roller tube. As such, during the manufacturing process, the thickness may be pre-determined, and the manufacturing process set accordingly.

As previously mentioned, one or more an intermediate layer may be provided between the inner layer 2 and the outer layer 3.

The or each intermediate layer may optionally include any one or combination of a polymer material of different color, to provide a further visual indication of the wear the roller tube.

The intermediate layer may also optionally incorporate a bonding material, to facilitate bonding in between the adjacently positioned layers.

The intermediate layer may also optionally incorporate a strengthening material, to improve the strength of the roller tube.

It will be appreciated that the roller tube of the present invention is preferably co-extruded to create a plurality of layers of different polymer materials.

Figure 4:
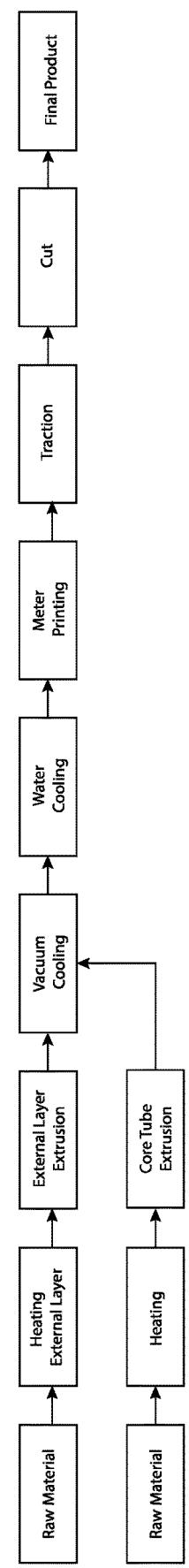

An outline of an exemplary co-extraction process is illustrated in FIG. 4.

Prior to commencement of the production process, as will be appreciated by persons skilled in the art, the various dimensions of the desired roller tube 1 may firstly be determined, including, the wall thickness of each layer 2 and 3.

Once the appropriate preparations are performed prior to initiation of the co-extraction process, the co-extrusion process can then commence by extracting the appropriate polymer materials and additives from respective hoppers and feeding these materials to the extruder.

As will be appreciated by person skilled in the art of co-extrusion, the mixing ratio, time, temperature and other characteristics may be varied, depending upon the materials being used, and, the desired properties and characteristics of the layers of the roller tube 1 being manufactured.

In the forgoing description of preferred embodiments, specific terminology has been resorted to for the sake of clarity. However, the invention is not intended to be limited to specific terms so selected, and it is to be understood that each specific term includes all technical equivalents which operate in a similar manner to accomplish a similar technical purpose. Terms such as "front" and "rear", "inner" and "outer", "above", "below", "upper" and "lower" and the like are used as words of convenience to provide reference points and are not to be construed as limiting terms.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

In this specification the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, addition and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments. e.g., aspects of one embodiment may be combined with aspects of another embodiment to realise yet other embodiments. Further, each independent feature or component of any given assembly may constitute an additional embodiment.

The invention claimed is:

1. A conveyor roller tube for a conveyor system, the conveyor roller tube comprising:
   an inner layer formed of a first polymer material; and,
   an outer layer formed of a second polymer material including a second layer additive to thereby provide high wear-resistant properties;
   wherein said conveyor roller tube is formed by a coextrusion process in which each of said first and second polymer materials are of a different color, and are co-extruded from separate hoppers using a single extruder die, to thereby form said roller tube having differently colored polymer layers, and
   wherein, in use when rotating in a conveyor system, the color difference between the inner and outer layers of said roller tube provides a visual indication of the wear of said roller tube.

2. The conveyor roller tube as claimed in claim 1, further comprising:
   at least one intermediate layer provided between said inner and outer layers.

3. The conveyor roller tube as claimed in claim 1, wherein said outer layer is formed to have any one or combination of the characteristics of:
   UV stability;
   fire-resistance; and,
   anti-static properties.

4. The conveyor roller tube as claimed in claim 1, wherein said outer layer is formed of a first polymer material comprising any one or combination of:
   polyethylene;
   high density polyethylene (HDPE);
   ultra high molecular weight polyethylene (UHMWPE); and,
   nylon.

5. The conveyor roller tube as claimed in claim 1, wherein said second layer additive includes glass fibres.

6. The conveyor roller tube as claimed in claim 1, wherein said inner layer is formed to have any one or combination of the characteristics of:
   high flexural strength;
   high flexural modulus;
   high elongation under tensile load; and,
   high tensile strength.

7. The conveyor roller tube as claimed in claim 1, wherein said inner layer is formed of a second polymer material comprising any one or combination of:
   polyethylene;
   high density polyethylene (HDPE);
   ultra high molecular weight polyethylene (UHMWPE); and,
   nylon.

8. The conveyor roller tube as claimed in claim 1, wherein said inner layer includes a first layer additive.

9. The conveyor roller tube as claimed in claim 8, wherein said first layer additive includes glass fibres.

10. The conveyor roller tube as claimed in claim 1, wherein each layer is formed to be of predetermined thickness.

11. The conveyor roller tube as claimed in claim 2, wherein said at least one intermediate layer includes any one or combination of:
   an intermediate wear indication layer of a different color, to provide a visual indication of wear of said roller;
   an intermediate bonding layer, to facilitate bonding between adjacently positioned layers thereto; and,
   an intermediate strength layer, to strengthen said roller.

12. A conveyor roller comprising the conveyor roller tube as claimed in claim 1.

13. A conveyor idler comprising at least one conveyor roller tube as claimed in claim 1.

14. A conveyor system including a plurality of conveyor roller tubes as claimed in claim 1.

15. A method of manufacturing the conveyor roller tube as claimed in claim 1, comprising the steps of:
   separately heating said first polymer material and said second polymer material, wherein said second polymer material is of a different color to said first polymer material;
   simultaneously feeding said first polymer material and said second polymer materials from respective hoppers to a die of a co-extruder to thereby form the conveyor roller formed of a plurality of differently colored polymer layers.

* * * * *